(No Model.) 14 Sheets—Sheet 1.
E. THEISEN.
EVAPORATING APPARATUS.

No. 463,466. Patented Nov. 17, 1891.

Fig. 1.

(No Model.) 14 Sheets—Sheet 2.

E. THEISEN.
EVAPORATING APPARATUS.

No. 463,466. Patented Nov. 17, 1891.

Fig. 2.

Witnesses:
J. A. Rutherford
Percy B. Hill.

Inventor:
Edward Theisen.
By James L. Norris.
Attorney.

(No Model.)  14 Sheets—Sheet 3.

E. THEISEN.
EVAPORATING APPARATUS.

No. 463,466. Patented Nov. 17, 1891.

(No Model.) 14 Sheets—Sheet 4.
E. THEISEN.
EVAPORATING APPARATUS.

No. 463,466. Patented Nov. 17, 1891.

Fig. 2ᵇ

(No Model.) 14 Sheets—Sheet 7.
E. THEISEN.
EVAPORATING APPARATUS.

No. 463,466. Patented Nov. 17, 1891.

Fig. 4ᵈ

Witnesses:— Inventor:
J. A. Rutherford. Edward Theisen,
Geo. W. Rea By James L. Norris.
Attorney.

(No Model.) 14 Sheets—Sheet 8.

E. THEISEN.
EVAPORATING APPARATUS.

No. 463,466. Patented Nov. 17, 1891.

Fig. 5.

Witnesses:
J. A. Rutherford
Percy B. Hills

Inventor:
Edward Theisen
By James L. Norris
Attorney (No Model.) 14 Sheets—Sheet 11.
E. THEISEN.
EVAPORATING APPARATUS.

No. 463,466. Patented Nov. 17, 1891.

(No Model.) 14 Sheets—Sheet 12.
E. THEISEN.
EVAPORATING APPARATUS.

No. 463,466. Patented Nov. 17, 1891.

Witnesses:
J. A. Rutherford
Percy B. Hills

Inventor:
Eduard Theisen
By James L. Norris
Attorney (No Model.) 14 Sheets—Sheet 14.

E. THEISEN.
EVAPORATING APPARATUS.

No. 463,466. Patented Nov. 17, 1891.

UNITED STATES PATENT OFFICE.

EDUARD THEISEN, OF SINZIG, GERMANY.

EVAPORATING APPARATUS.

SPECIFICATION forming part of Letters Patent No. 463,466, dated November 17, 1891.

Application filed May 14, 1890. Serial No. 351,767. (No model.) Patented in France November 7, 1889, No. 201,783, and in England November 29, 1889, No. 19,222.

*To all whom it may concern:*

Be it known that I, EDUARD THEISEN, a citizen of the United States, residing at Sinzig-on-the-Rhine, in the German Empire, have invented certain new and useful Improvements in Apparatus for Evaporating Liquids, (for which I have obtained Letters Patent in France, dated November 7, 1889, No. 201,783, and in Great Britain by patent dated November 29, 1889, No. 19,222,) of which the following is a specification.

Figs. 2 to $10^b$ illustrate various modifications, hereinafter described.

This invention relates to an improved construction of apparatus for evaporating liquids; and it consists, mainly, of a centrifugal feeder with rapidly-revolving disks or plates, which are mostly of a dished form, into the central part of which the liquid to be evaporated and the air are introduced separately in order to be brought into contact either while passing along the centrifugal plates or after issuing therefrom. In consequence of the rapid motion of the air or of both the air and the liquid, and also in consequence of the effective distribution of both a very rapid and energetic evaporation is effected, which insures a very powerful action of the feeder, while occupying comparatively little space.

Figure 1:
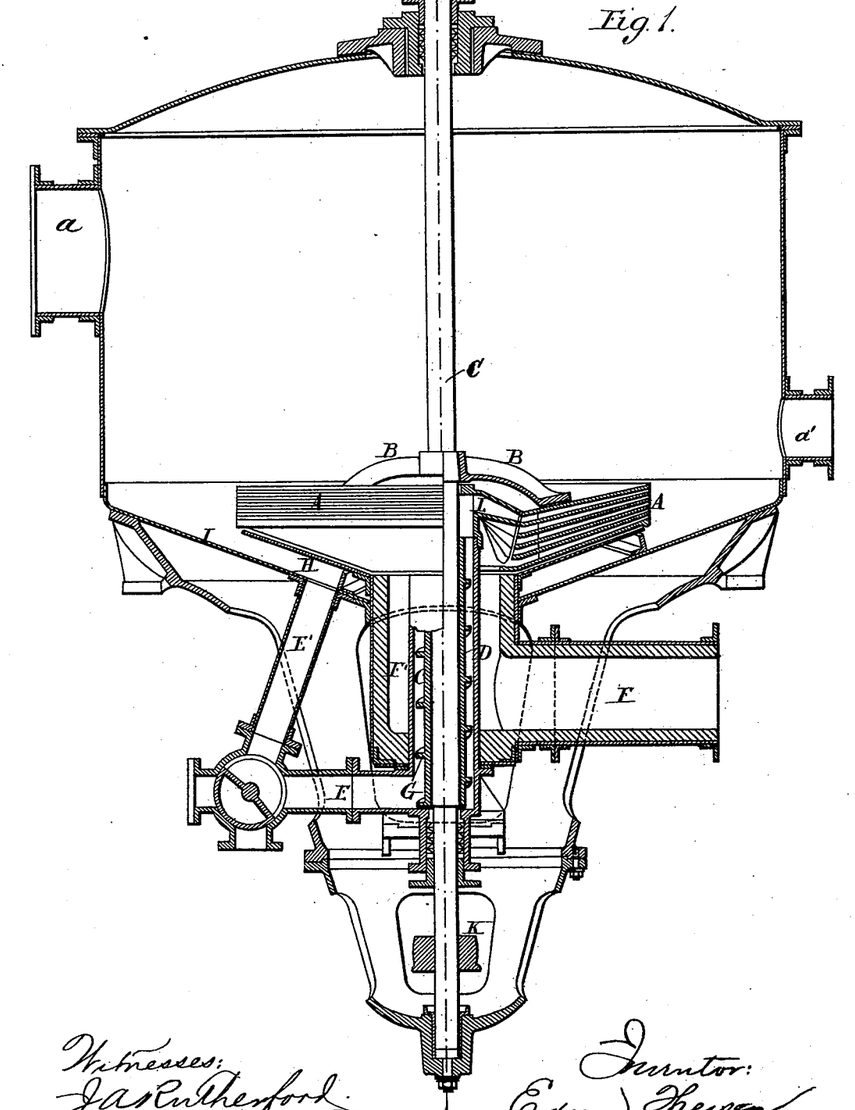
Figure 1 is a vertical partly sectional elevation of a centrifugal feeder for an evaporating apparatus illustrating my invention.

On the accompanying drawings, Fig. 1 shows a vertical section of portion of an evaporating apparatus in which the plates or disks A are inclosed in a casing I, which disks are advantageously made of a dished or cone shape, and are supported by means of arms B, that are sleeved on the driving-shaft C, which receives rapid rotary motion by means of a pulley K. The spaces between the several disks A communicate through channels L with a stationary tube D, surrounding the shaft C, and which is in connection with the pipe E, through which the liquid to be evaporated is supplied. The tube D is surrounded by an annular chamber F', communicating with the air-supply pipe F, and this chamber carries the casing I of the centrifugal feeder, and also a stationary dished plate H, situated closely beneath the lowest rotating disk A.

The liquid passing in through the pipe E is raised by the rotation of the screw-blade G, formed on a sleeve fixed to the shaft C, and flows through the channels L onto the several plates A. At the same time air or hot combustion gases pass through the pipe F and chamber F', also into the spaces between the plates A, where the air or gas comes into intimate contact with the liquid and is subject, together with the latter, to the centrifugal action of the plates, the liquid becoming thereby rapidly evaporated, owing to its dispersion and intimate admixture with the air. On issuing from the plates the liquid is still subject to the evaporative action of the air issuing both from between the plates A and from the space between these and the fixed plate H, so that a very energetic evaporation and perfect utilization of the air is effected. The liquid that is not evaporated flows through the pipe E', connected to the bottom of the casing I, back to the pipe E in order to be again raised by the screw-blade G. The air saturated with the vapor of the liquid is led off from the casing I through the branch openings *a* and conveyed wherever required. If, for example, the mixture of air and vapor issuing from the first feeder is found still to have so high a temperature as to render it applicable for a second evaporative process in a second feeder this may be effected. If the air saturated with vapor is to be used for heating purposes, the air-supply entering at F is previously heated; but if it is intended to abstract heat from the liquid by the evaporative process the air is supplied cold.

Figure 2:
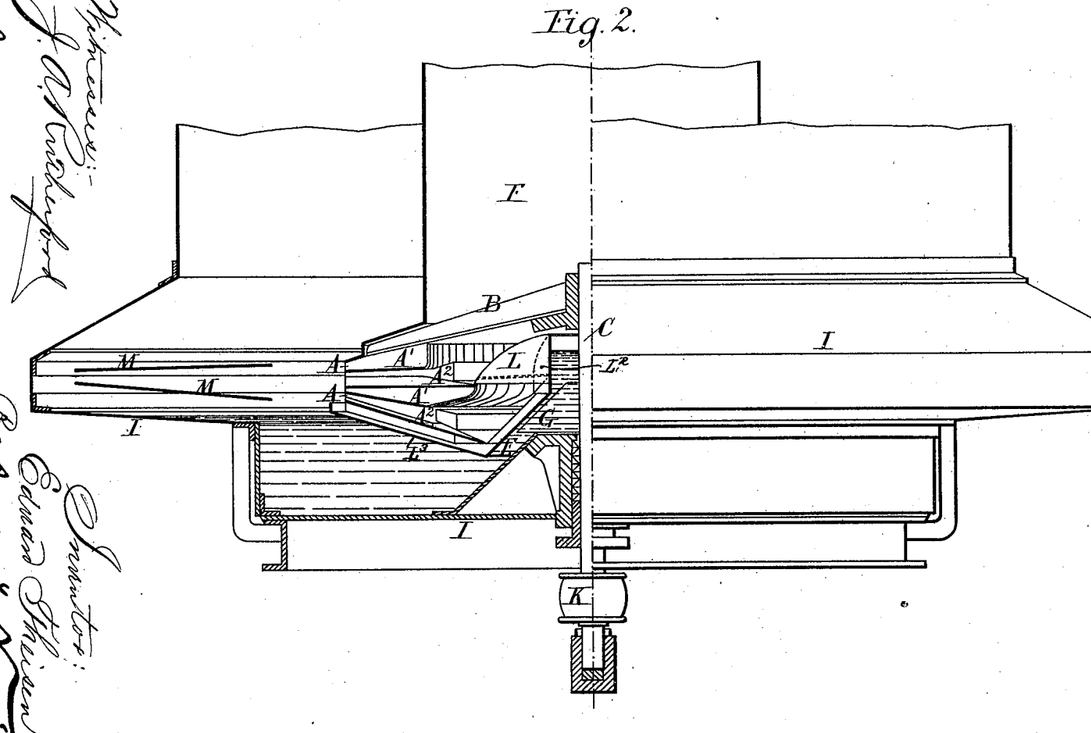
Figure 2A:
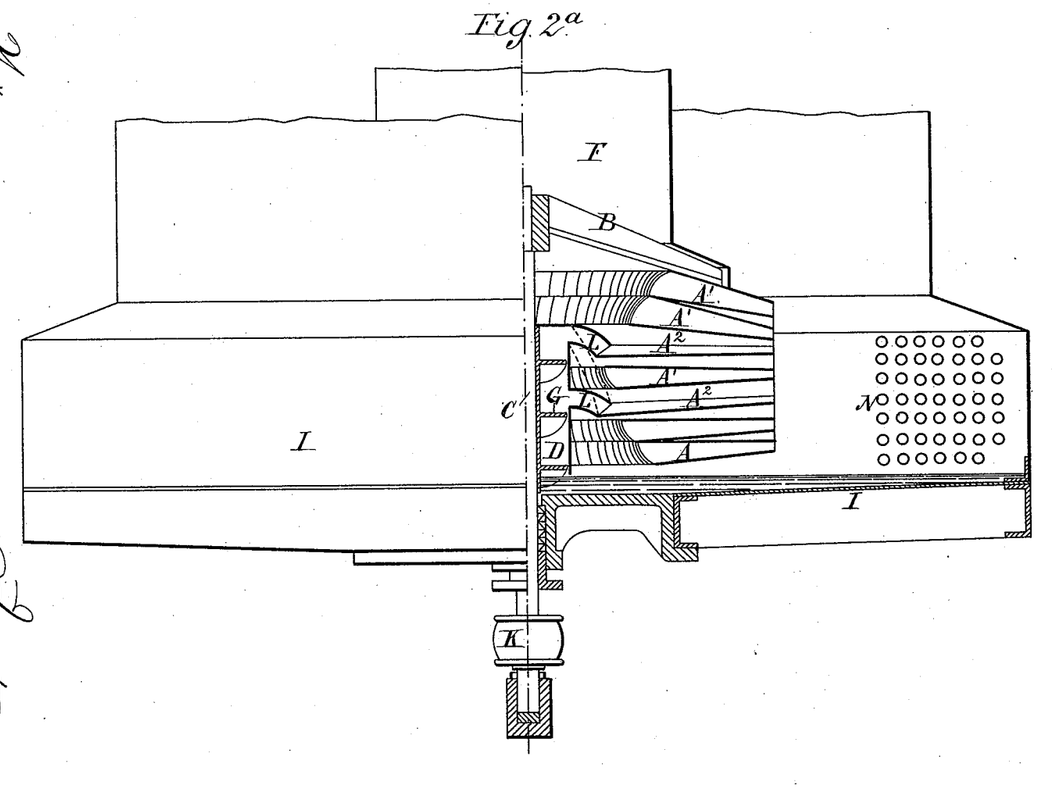
Figure 2B:
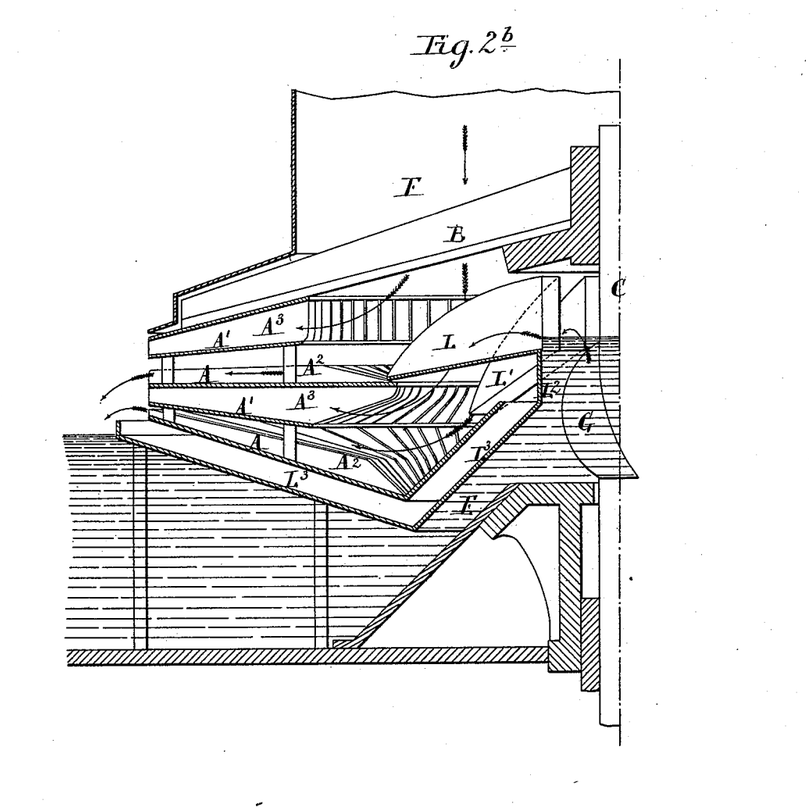

Fig. 2 shows a part vertical section and part elevation, and Fig. $2^b$ a part enlarged section of a modified arrangement of the above-described apparatus, the principal difference consisting in that the passages or channels L for the liquid are so arranged that the liquid is only distributed among some of the centrifugal plates A while the air is distributed among the others.

In Figs. 2, $2^a$, and $2^b$ the air-supply pipe or tube F is vertical, while in Figs. 1, 4, 6, and 7 it is horizontal.

Figure 3:
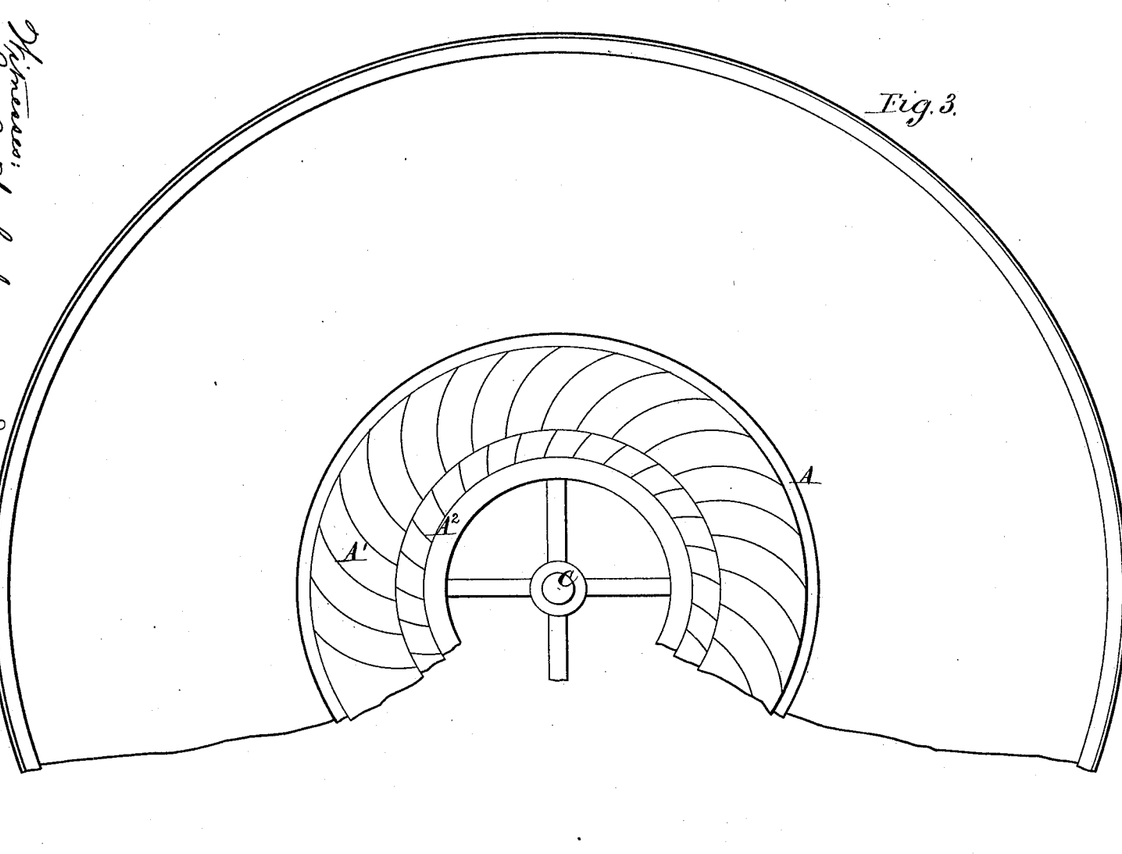

The liquid to be evaporated is raised by the screw-blade G from the well in the casing through passage E and runs over the fixed guide-channels L and L' onto the inner edge of the upper and lower liquid-disks A, which are provided with guide-vanes A², and is propelled outward by these. The air drawn in through the tube F, in consequence of the partial vacuum formed at the center of the apparatus, passes onto the air-disks A, which may be provided with vanes A' for increasing their action, as shown in the sectional plan, Fig. 3, of such air-disks, and is also propelled outward. On issuing from the centrifugal feeder the air and liquid come into contact with each other, and in consequence of their effectual mixture and rapid motion an effectual evaporation or cooling of the liquid thrown out is produced. The evaporation or cooling is also aided by the catching-plates M, Fig. 2, carried by supports in the casing I, onto which the liquid falls and from which it descends into the well of the casing, from which it is again raised and acted upon, as above described.

The disks A A' are all carried by the arms B from the driving-shaft C, as before. The tube L², carrying the spouts L L' and the coned enlargement L³ thereof, forming the passage E, are suitably supported from the bottom of the casing.

Fig. 2ª shows a part section and part elevation of a modification of the above-described construction, in which A' A' are the disks for air, while A² are the disks for liquid, supplied with liquid by the worm G in the central passage D and spouts L. The liquid is thrown by the disks A² onto pipes N, heated by steam, &c., so that the liquid in flowing down in a thin layer over these pipes is rapidly evaporated under the combined action of the heat and the air propelled from the centrifugal disks A'. The liquid not evaporated falls onto the inclined bottom of the casing, which leads it back to the worm G again. C is, as before, the driving-shaft; B the arms supporting the disks A' A², which are all connected together, and F the air-supply tube.

Figure 4:
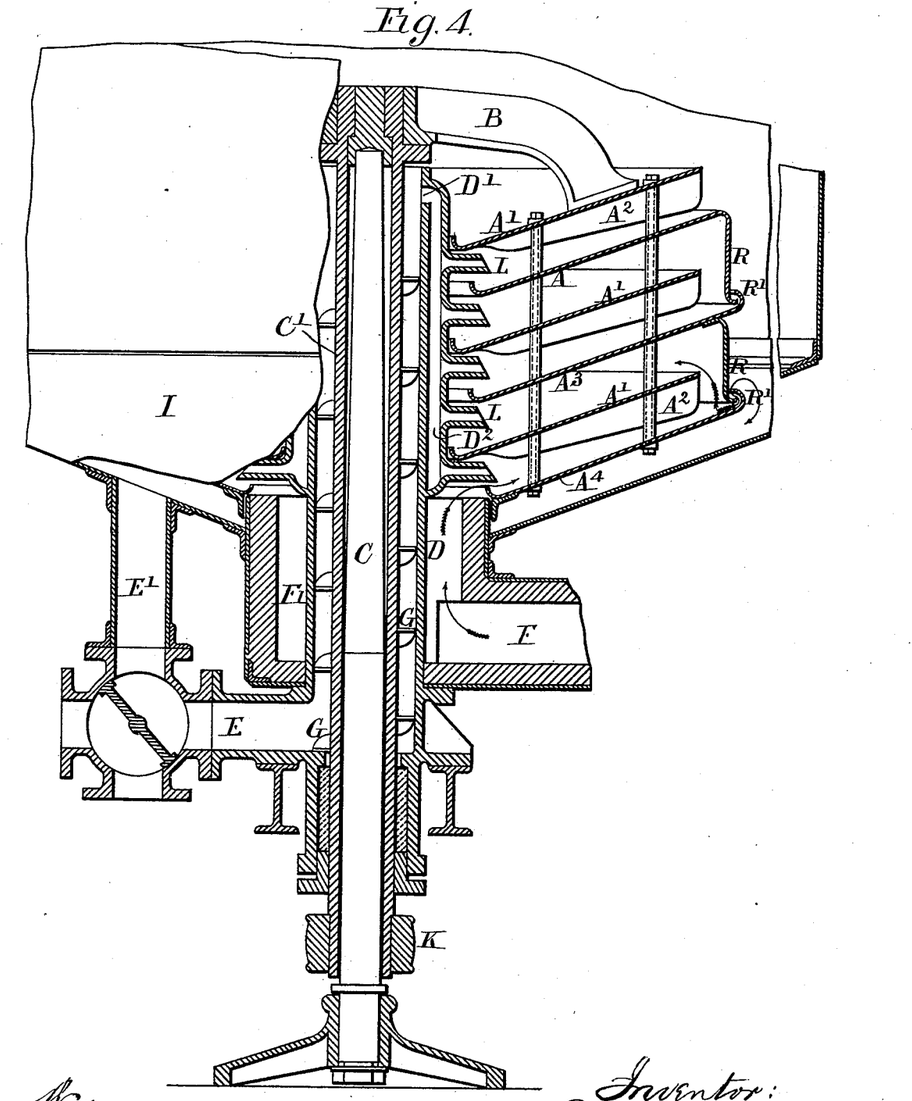

Fig. 4 shows a vertical section of a modification of the first-described arrangement, whereby the air-supply is made to come in contact consecutively with the liquid passing over the several centrifugal disks. For this purpose a fixed central shaft C supports at its upper end a tubular shaft C', the lower end of which carries the driving-pulley K, while its upper end carries by means of arms B the set of disks A A', which are all suitably tied together, and consequently all revolve with the shaft C'. Surrounding the tubular shaft C' at some distance therefrom is a fixed tube D, and the shaft C' has a worm G revolving in the annular space between C' and D for raising the liquid to be acted upon. The upper end of the tube D is closed by a flange on shaft C', and it has below this side openings D', leading into an annular outer passage D², from which project a series of spouts L, so that the liquid raised by the worm G will flow through D' D² and L onto the disks A A' A³ A⁴. Of these the disk A has a downward-extending flange R, reaching down to the disk A³, where it has an outwardly-curved lip engaging loosely with an inwardly-curved lip R' on the disk A³. This disk has also a downward-extending flange R, with outwardly-curved lip engaging loosely with an inwardly-curved lip R' on the bottom disk A⁴. The disks A', intermediate between those above mentioned, are of smaller diameter than the latter, so as to leave annular spaces between them and the flanges R. Their inner curved edges are situated as close as practicable to the cylindrical passage D², while the inner edges of A A³ A⁴ are at some distance therefrom. The under sides of the disks A', being provided with vanes or ribs A², it will be seen that the air or gases being made to pass from the annular passage F' onto the lowest disk A⁴, while at the same time liquid is delivered onto the same by the spout L, such liquid will be thrown outward by centrifugal action, passing through the open joint R R', where it will form a liquid seal, preventing the passage of the gases, so that these being also thrown outward by the action of the vanes A², fixed or formed on the under sides of the disks A', will be forced to pass up between the edge of A' and R, and then to pass inward again between A' and A³. They then pass between the inner edge of A³ and D² to the upper side of A³, where they are again propelled outward by the action of the vanes A², and so on, alternately backward and forward over all the disks in succession, while at the same time they exercise the desired evaporative action upon the liquid flowing outward over the disks. On issuing from between the disk A and the top disk A', the gases pass off through a pipe, as in the arrangement at Fig. 1, the other parts of the apparatus being of the same construction as described with reference to that figure.

Figure 4D:
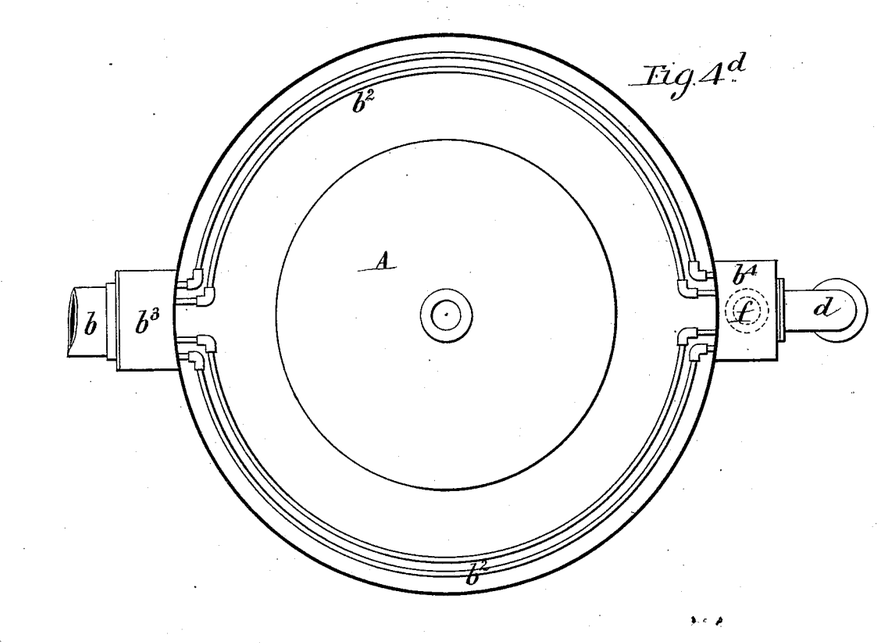
Figure 10A:
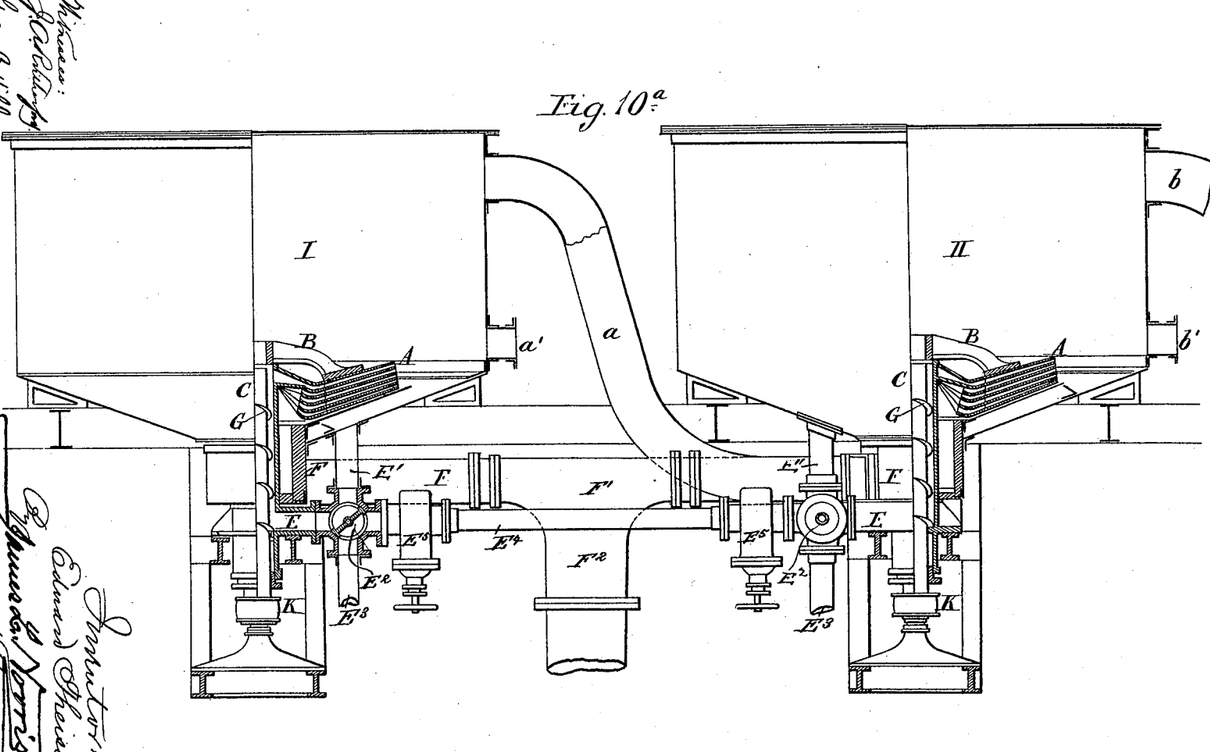

Fig. 4ᵈ is a sectional plan of the apparatus shown in Fig. 10ᵇ, hereinafter described.

Figure 5:
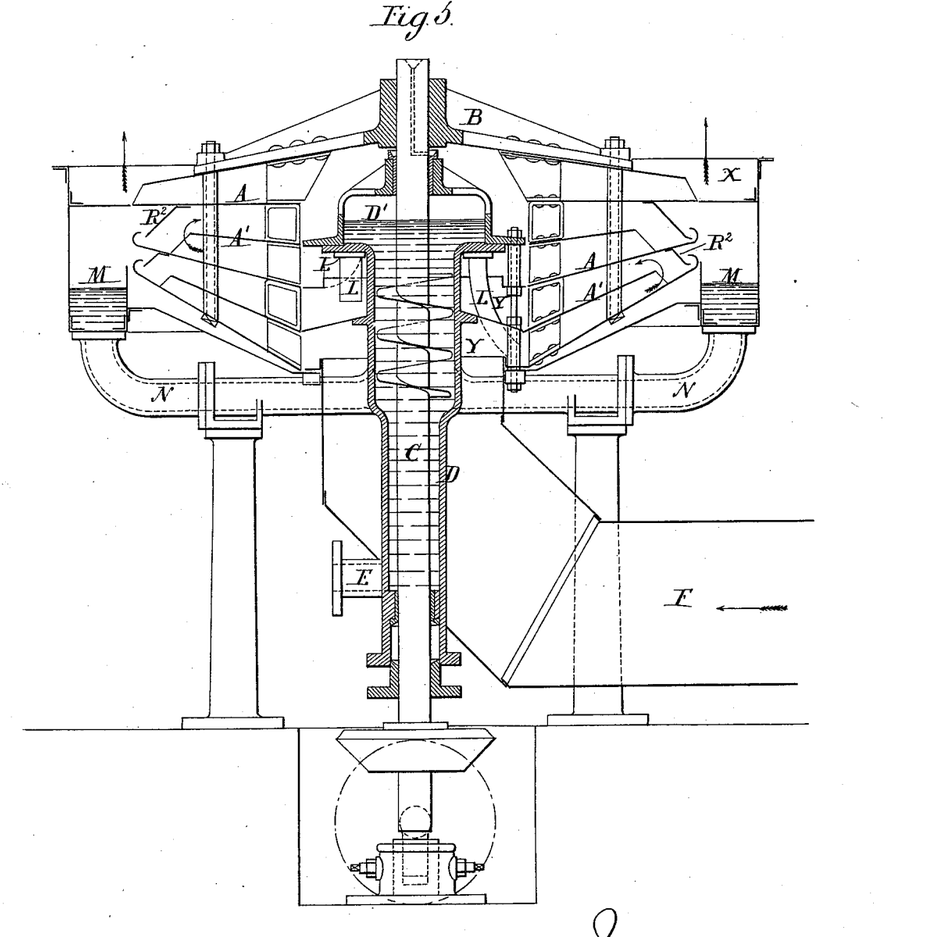

Fig. 5 shows a modified construction of this arrangement, in which the water seal is formed by flanges R², projecting down from the under sides of the plates A, the liquid being supplied to the plates A' through tubes L, projecting down varying distances from the enlarged top D' of the tube D. The liquid ejected through the water seal is caught in an annular trough M of the casing from which it is led back by pipes N to the cylinder D. The disks A A' are all carried by the arms B, sleeved on the shaft C, which is driven by gearing at bottom and which carries a screw-blade in the enlarged upper part D' of the tube D, by which the liquid supplied by the pipes N and by the branch pipe E at bottom is raised to the spouts L. The air is supplied to the space between the lowest pair of disks A A' from the flue F, and it passes thence backward and forward through the upper spaces between the plates, as described with reference to the previous construction, escaping from the outer periphery of the uppermost space into the atmosphere above the fixed annular partition X of the casing. Partitions are also provided at Y Y, supported by the tube D D', and meeting the inner edges of the disks A A', in order to prevent the air from ascending directly from flue F to the upper spaces between the disk and insure its passing in the zigzag direction described.

Figure 6:
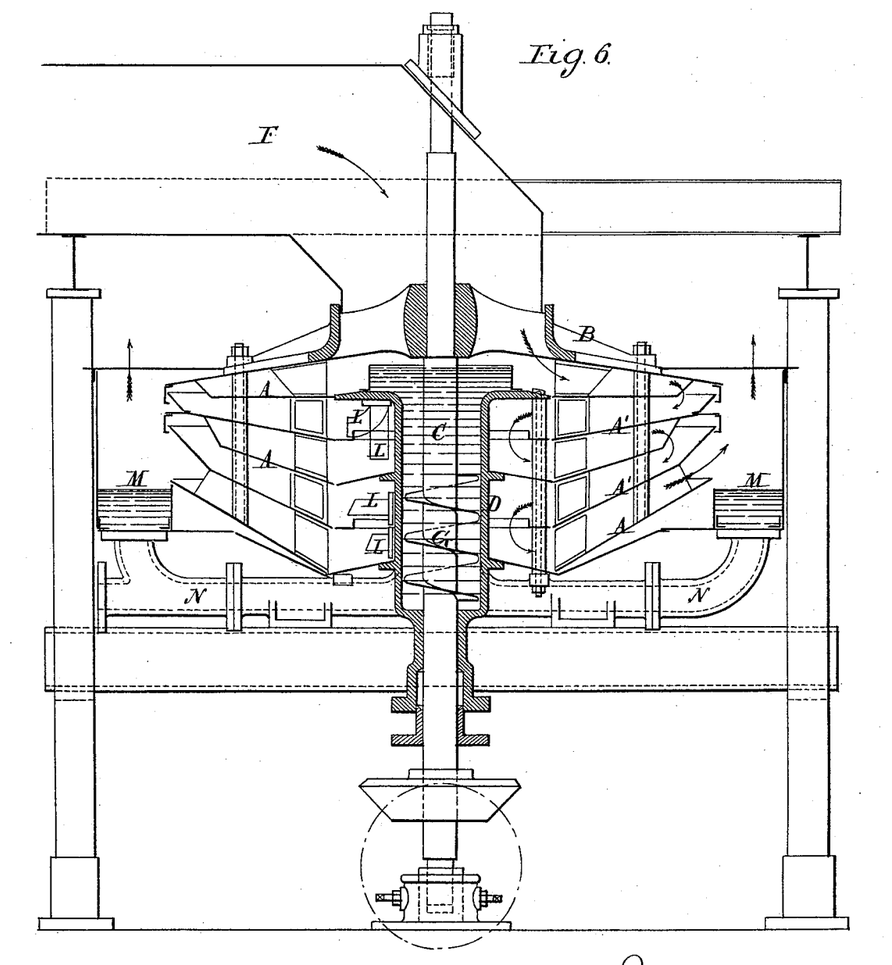

Fig. 6 shows another modification, which only differs from the preceding one in that the air or gas supply is effected from the flue F at top and is made to travel downward, as indicated by the arrows, until it escapes from between the lowest plates A and A' into the surrounding casing.

Figure 7:
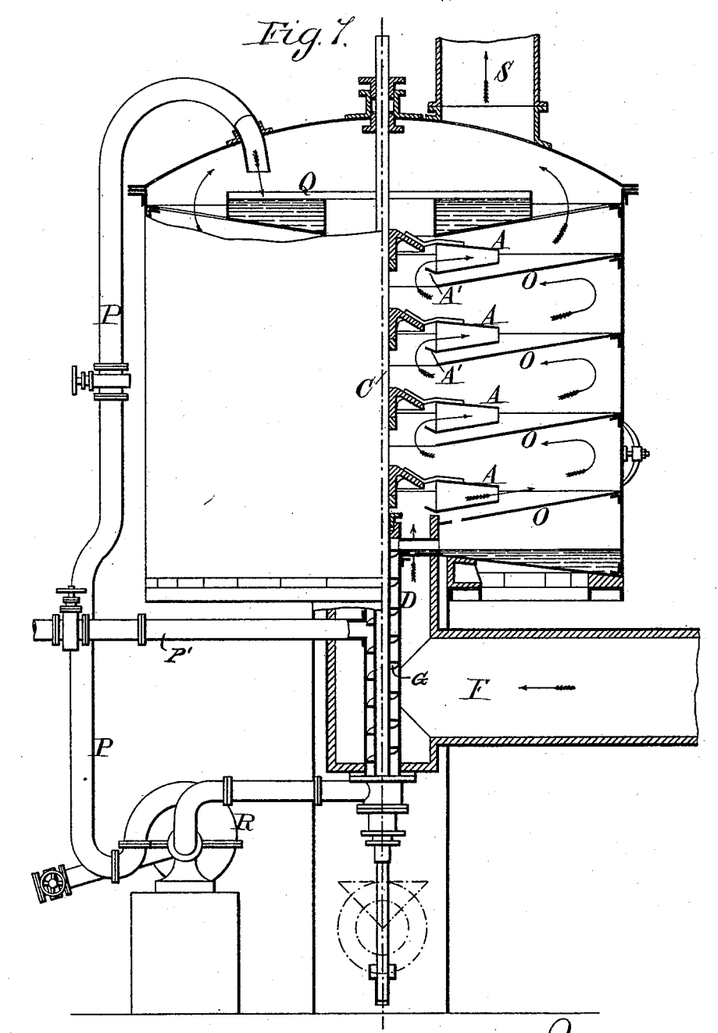
Figure 7A:
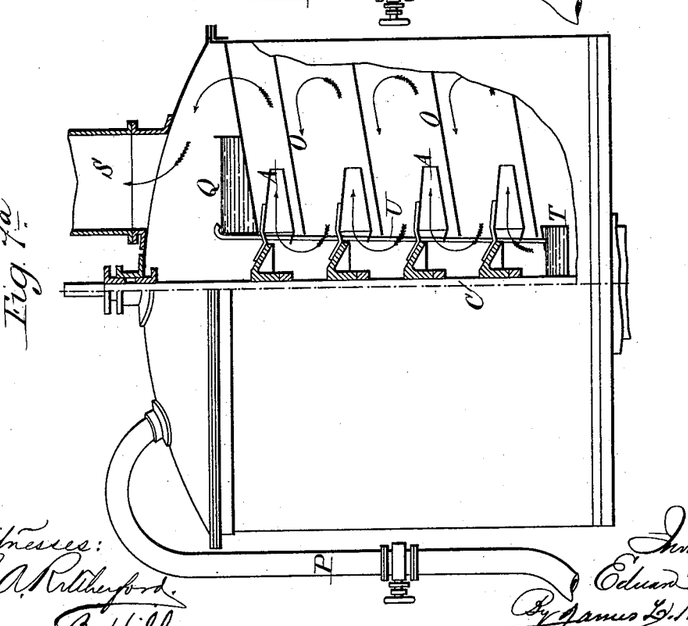
Figure 7B:
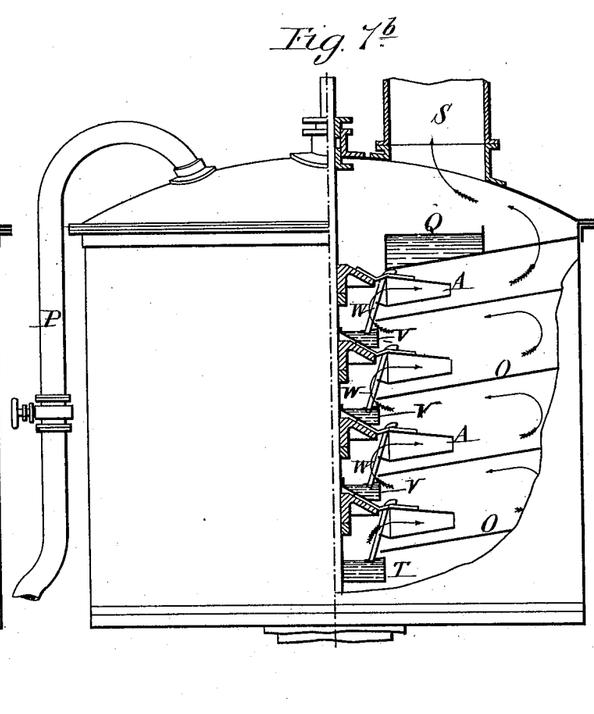

Fig. 7 shows an arrangement in which the several disks or fans A A A are separated from each other in the casing by fixed partitions O O O, extending from the casing to a certain distance from the central shaft C, which carries the fans A by means of arms. Each of the fans A has at its lower edge a small projecting trough A'. The liquid to be evaporated being supplied by a pipe P to an annular trough Q in the upper part of the casing, it overflows from this onto the trough A' of the top fan A. Here it is acted upon by centrifugal force of the fan, which throws it outward onto the partition O, on which it then flows inward again and falls from the inner edge thereof onto the trough A' of the next fan. There it is again thrown outward, and so on, until it falls from the lowest plate O into the bottom of the casing, from which it passes into the tube D, where it descends to the pump R to be again raised through pipe P to the tank Q. At the same time the air or gases pass from flue F first through the bottom fan A in contact with the liquid also passing through, then over the liquid flowing down over the bottom plate O, then through the liquid flowing down from the second plate O and then through the second fan A, and so on until it escapes up the flue S. Thus it will be seen that the air comes into very extended and repeated contact with the liquid, whereby a most effectual evaporation is effected. A branch pipe P' is provided on the tube D for leading away the liquid when the evaporating operation is completed without passing it through the pump R. The worm formed on the shaft C within the tube D serves for propelling the liquid downward toward the pump R, so as to accelerate the circulation. In the modification of this arrangement shown at Fig. $7^a$ the liquid is caught at the bottom by a trough-shaped vessel T, fixed to the shaft C and carrying tubes U, extending in an outwardly-inclined direction up to the trough Q, so that the liquid flowing down is propelled by the centrifugal action of the trough T up into the trough Q again; or, instead of this, the arms of each of the fans A carry a trough V, as at Fig. $7^b$, which catches the liquid falling from the plate O above and propels it by centrifugal action up pipes W, carried by V into the upper fan A again, so that one and the same body of liquid is caused to flow over and over again through one and the same fan A and partition O until it has been evaporated to the requisite degree of concentration. In either of these arrangements any liquid that may fall down to the bottom of the casing is conveyed back to the top tank O, again through pipes D and P, Fig. 7, by means of a pump, as in the previously-described arrangement. The parts situated below the casing, including the flue F for the supply of the air or gas, being precisely the same as in Fig. 7 are not repeated.

Figures 8, 9:
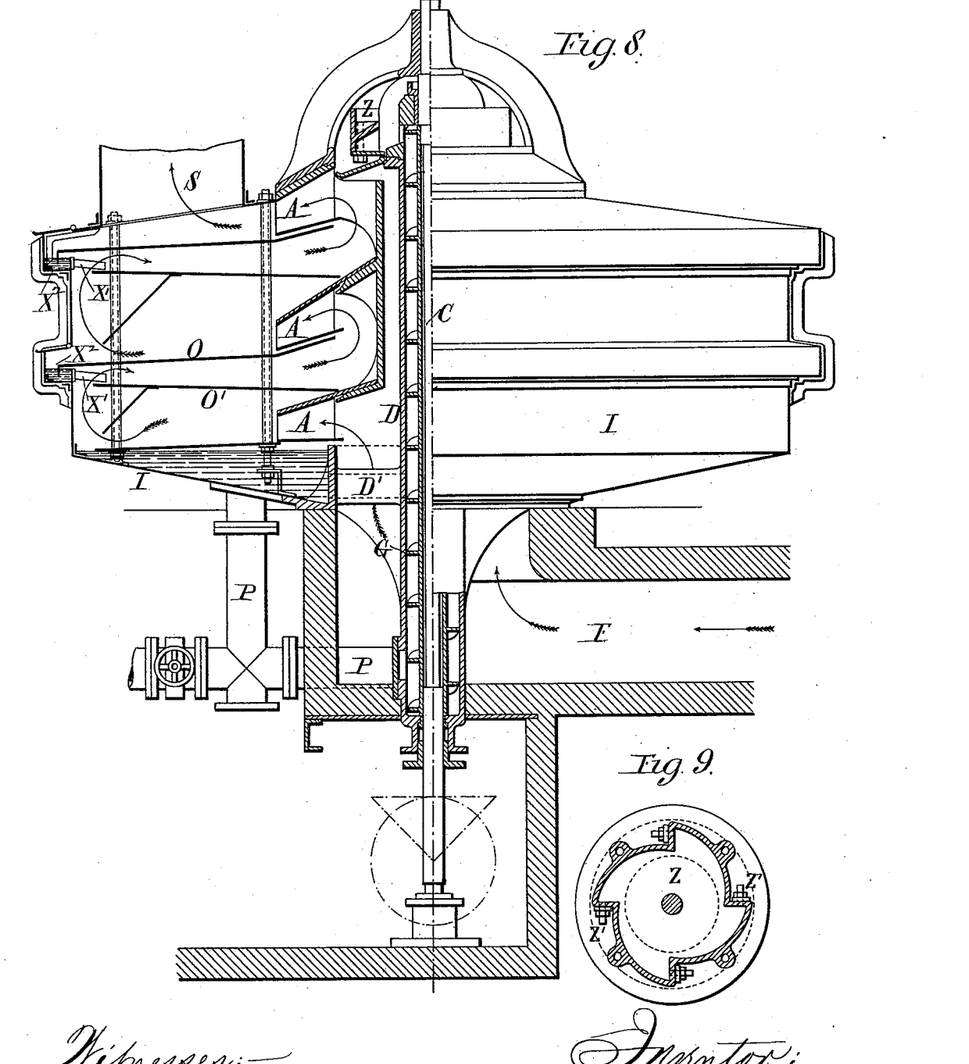

Fig. 8 shows another modification of the above-described arrangement, in which there are two partitions O O' between each two fans A, the one O being inclined outward and formed at its outer edge with a flange dipping into an annular trough $X^2$, fixed to the casing, so that the liquid flowing down the partition into the trough forms a water-seal with the flange, preventing the passage of air, the liquid being discharged from the trough through pipes X' onto the second partition O', which is inclined toward the center, so that the liquid descends upon it and falls onto the fan below. The partitions O' stop short at a certain distance from the troughs $X^2$, so as to leave space for the passage of the upward current of air, which is thus made to pass from the fans first outward over the liquid on the plates O and then inward again over the liquid on the plates O' to the next fan above. The liquid is in this case supplied to the fans by a turbine-shaped receptacle Z (shown in sectional plan at Fig. 9) and carried by the fan-shaft C, which receptacle is supplied by liquid by the worm G and delivers it through the lateral spouts Z' onto the top disk or fan. The liquid is fed from the bottom of the casing through tubes D', back into the cylinder D, in which it is raised to the vessel Z by the worm G, as above stated, and when sufficiently concentrated it is discharged through pipes P.

Figs. $10^a$ and $10^b$ show an application of the first above-described apparatus for repeated utilization of the heat. The liquid passes through the pipe $a'$ into the first apparatus I, where it is acted upon by a centrifugal feeder constructed, as described, with refence to Fig. 1, the parts being indicated by the same letters of reference, hot air or gases being supplied from a heating apparatus or furnace through flue F. The air saturated with vapor passes off through pipe $a$ into the second apparatus II, which is of the same construction as apparatus I, the only difference being that in II the hot air saturated with moisture coming from I through flue F is made to evaporate the liquid entering through the pipe $b'$. If necessary, an additional supply of dry heated air from the heating apparatus may be employed, which supply enters from a branch F' on flue-pipe $F^2$. The liquid flows off from the bottom of the casings of I and II through pipes E E', which are provided with valves $E^2$, according to the position of which it is either led back to the tube D or away through the pipe $E^3$, and the pipes E of the two apparatus I and II are also connected by a pipe $E^4$, provided with shut-off sluices $E^5$, so that the liquid from I can be made to flow off through pipe $E^3$ of apparatus II, or vice versa. The air saturated with moisture passing from the apparatus II is led through pipe $b$ into the pipes $b^2$ of the apparatus III, Fig. $10^b$, which are immersed in the liquid to be evaporated in this apparatus and which pass from the box $b^3$ round the sides of the casing to the box $b^4$, as shown in the sectional plan, Fig. $4^a$. The evaporation of the liquid is assisted by a centrifugal feeder A of the same construction, as in I and II. The air-supply to the centrifugal feeder is effected through flue F and pipe $k$. The liquid condensed in the pipes $b^2$ flows off through the pipe $f$, while the moist air and uncondensed gases from these pipes are drawn off through a pipe $d$ by means of a fan $e$. The air saturated with vapor in apparatus III passes through pipe $c$ to wherever required.

Having thus described the nature of my invention and the best means I know of carrying the same into practical effect, I claim—

1. In evaporating apparatus, the combination of a series of superposed disks mounted on a vertical rapidly-revolving shaft inside a casing and having central openings, a duct supplying liquid to be evaporated centrally to the spaces between the said disks, and a duct supplying air or other gases also centrally to the spaces between the said disks, substantially as described.

2. In evaporating apparatus, the combination of a series of superposed disks mounted on a vertical rapidly-revolving shaft inside a casing and having central openings, a duct supplying liquid to be evaporated centrally to the spaces between some of the disks, and a duct supplying air or other gases to the spaces intermediately between those through which the liquid passes, so that the liquid and the air-currents may be brought into contact on issuing from the periphery of the disks, substantially as described.

3. An evaporating apparatus comprising rotary disks, plates, or fans, means for rotating by which the liquid and the air or gases for effecting the evaporation thereof are made to flow over said plates by centrifugal action, fixed partitions between the disks, plates, or pans, a revolving trough-shaped receptacle carried by the driving-shaft, and tubes rising from said receptacle for raising the liquid therein by centrifugal action to the disks, plates, or fans above, substantially as described, 4. An evaporating apparatus consisting of rapidly-revolving disks, plates, or fans, means for rotating by which the liquid and the air or gases for effecting the evaporation thereof are made to flow over said plates by centrifugal action, and means for raising the liquid from a lower level to the upper disks, plates, or fans, substantially as described.

5. In evaporating apparatus, the combination of a series of superposed disks mounted on a vertical rapidly-revolving shaft inside a casing and having central openings, ducts supplying liquid to be evaporated and air or other gases centrally to the spaces between the said disks, and plates or equivalent surfaces fixed in the casing beyond the peripheries of the said disks, upon which the liquid and air or other gas propelled by the latter are made to impinge, substantially as described.

In testimony whereof I have signed my name to this specification, in the presence of two subscribing witnesses, this 14th day of April, A. D. 1890.

EDUARD THEISEN.

Witnesses:
CHAS. D. ABEL,
*Patent Agent, 28 Southampton Buildings, London, W. C.*
JNO. P. M. MILLARD,
*Clerk to Messrs. Abel & Imray, Consulting Engineers and Patent Agents, 28 Southampton Buildings, London, W. C.*